United States Patent [19]

Lamperski et al.

[11] Patent Number: 4,540,294
[45] Date of Patent: Sep. 10, 1985

[54] SPLIT BEARING SHELL

[75] Inventors: Heinrich Lamperski, Mühlheim; Paul Gerling, Oberhausen, both of Fed. Rep. of Germany

[73] Assignee: Glyco Maschinenbau-GmbH, Essen, Fed. Rep. of Germany

[21] Appl. No.: 500,293

[22] Filed: Jun. 2, 1983

Related U.S. Application Data

[63] Continuation-in-part of Ser. No. 373,804, Apr. 30, 1982, abandoned.

[30] Foreign Application Priority Data

May 2, 1981 [DE] Fed. Rep. of Germany ....... 3117422

[51] Int. Cl.³ .................. F16C 33/04; F16C 33/60
[52] U.S. Cl. .................................. 384/273; 384/502
[58] Field of Search ............... 308/236, 196, 216; 384/273, 502; 403/344, 381

[56] References Cited

U.S. PATENT DOCUMENTS 1,644,611 10/1927 Rieffert .......................... 308/196
2,048,380 7/1936 Hansen ........................ 403/381 X
2,087,184 7/1937 Dietrich ....................... 308/236 X

FOREIGN PATENT DOCUMENTS 2711938 9/1977 Fed. Rep. of Germany .
70140 11/1927 Sweden ......................... 308/196

Primary Examiner—Stuart S. Levy
Assistant Examiner—Thomas R. Hannon
Attorney, Agent, or Firm—Karl F. Ross; Herbert Dubno

[57] ABSTRACT

A bearing shell insertable between two relatively movable members, such as a housing and a shaft, is split into two semi-cylindrical halves with transverse end faces adjoining each other along an axial parting plane. At least one link extending across that parting plane positively engages the two half-shells for holding them inseparably together but with enough relative play to facilitate their self-centering insertion between the two members. The link may be a headless bolt, threaded into one end face and received with clearance in a recess of the other end face in which it is loosely retained by a cross-pin, or else it may be a flat, generally C-shaped or X-shaped clip with one or two pairs of heads loosely fitted into shallow depressions on the outer surfaces of the half-shells closely spaced from their end faces.

7 Claims, 6 Drawing Figures

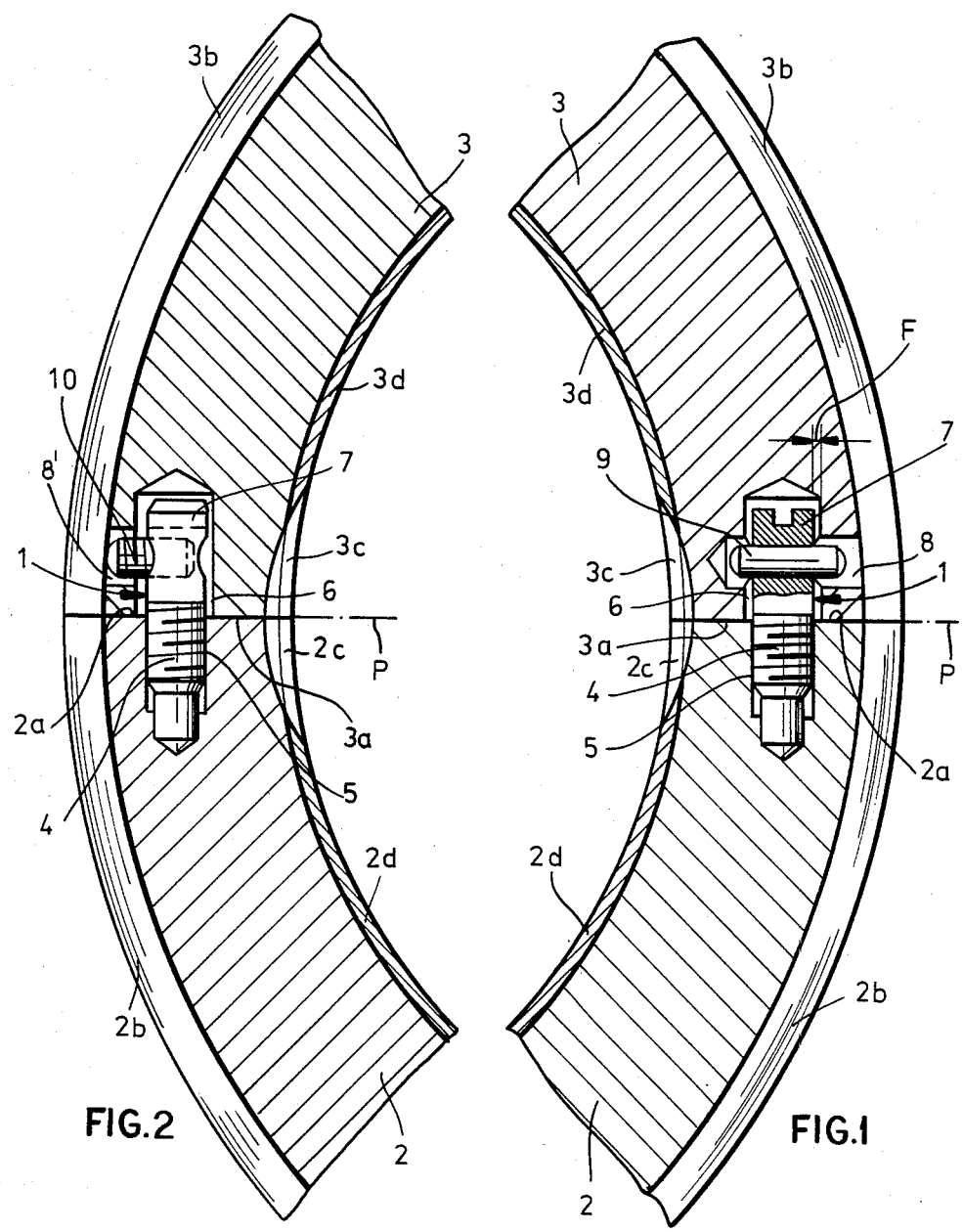

SPLIT BEARING SHELL

CROSS REFERENCE TO RELATED APPLICATION

This is a continuation-in-part of our copending application Ser. No. 373,804 filed Apr. 30, 1982, now abandoned.

FIELD OF THE INVENTION

Our present invention relates to a bearing shell, insertable between two relatively movable members such as a housing and a shaft, which is split into two semicylindrical halves with transverse end faces adjoining each other along an axial parting plane.

BACKGROUND OF THE INVENTION

It is customary to provide a split bearing shell of the type referred to with fasteners fixedly interconnecting its two halves, as by screws extending transversely across their end faces. Even though these halves are well centered upon being fitted into the annular interspace between the two relatively rotatable and/or slidable members, the art has hitherto considered it necessary to attach them firmly together so that the shell can be withdrawn as a unit when these members are separated from each other. This is basically desirable in order to prevent the temporary frictional retention of one of these half-shells in the outer member from which that half-shell could subsequently drop so as to be damaged or destroyed.

The rigid interconnection of such half-shells by screws or the like involves rather complex machining operations and, furthermore, has the drawback of causing stresses due to unavoidable deviations from exact coaxially upon being inserted between the associated inner and outer members.

OBJECT OF THE INVENTION

The object of our present invention, therefore, is to provide an improved bearing shell which obviates these inconveniences.

SUMMARY OF THE INVENTION

We realize this object, in accordance with our present invention, by the provision of link means extending across at least one pair of end faces of the two half-shells for positively interconnecting same with sufficient play to enable limited relative displacement thereof parallel as well as perpendicular to the parting plane upon the insertion of the half-shells into the interspace of the associated members, yet with prevention of separation thereof upon removal from that interspace.

The link means referred to may comprise a bolt traversing the aforementioned pair of end faces while having one extremity threaded into one half-shell and having another extremity received with clearance in a recess of the other half-shell. In order to prevent any separation of the two half-shells from each other in their extracted position, we prefer to provide the second half-shell with a generally radial bore intersecting its recess, the second bolt extremity being engaged by a retaining element loosely fitted into that bore.

Pursuant to another feature of our invention, the two half-shells are formed with aligned peripheral grooves which communicate with respective peripheral depressions disposed laterally thereof in the vicinity of the pair of end faces referred to, the link means then comprising a clip having a body received with clearance in these grooves and further having heads extending with clearance into the peripheral depressions. The body of the clip may be a substantially flat strip but could also be curved in conformity with the shell periphery on which it is accommodated. The clip could be generally C-shaped or X-shaped, with either two or four heads, as will presently become apparent.

BRIEF DESCRIPTION OF THE DRAWING

The above and other features of our invention will now be described in details with reference to the accompanying drawing in which:

FIG. 1 is a fragmentary cross-sectional view of a bearing shell according to our invention, showing two halves thereof contacting each other along an axial parting plane while being loosely but positively interconnected by a bolt-shaped link;

FIG. 2 is a view similar to FIG. 1 but illustrating a modified link;

SPECIFIC DESCRIPTION

Figure 3:
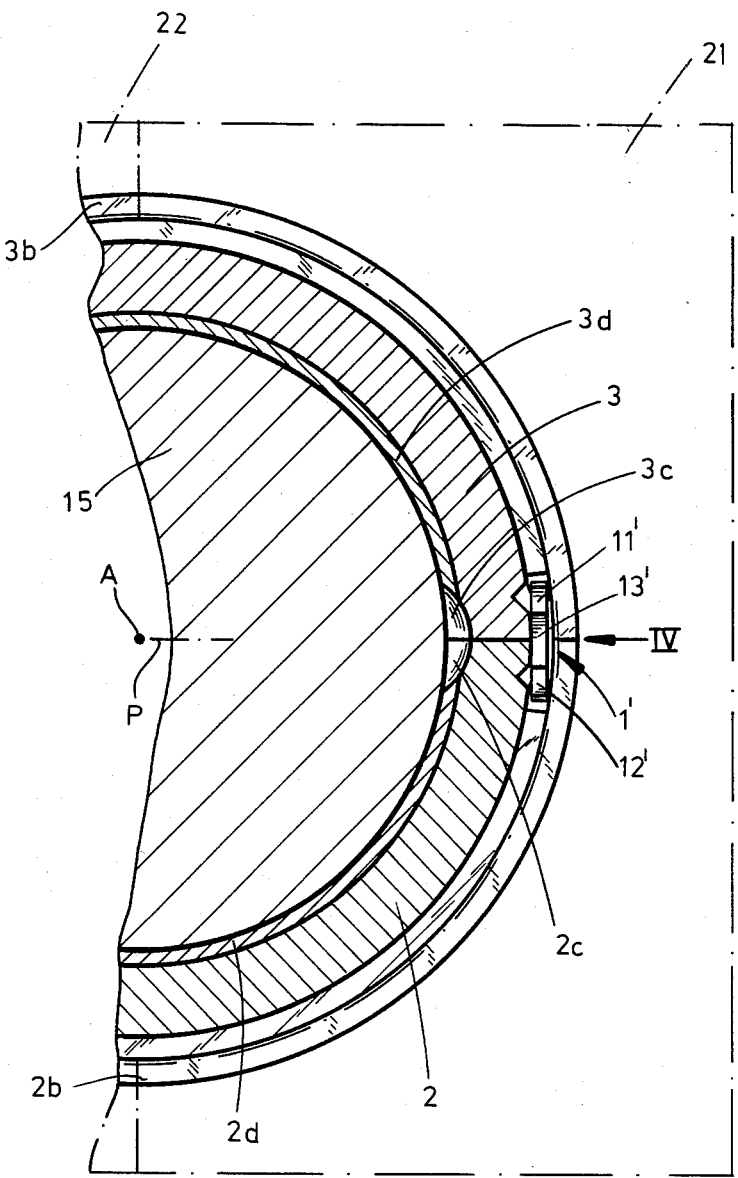
FIG. 3 is a further cross-sectional view, illustrating a link designed as a clip.

A bearing shell according to our invention, partly illustrated in FIG. 1, has two halves 2 and 3 with end faces 2a and 3a meeting at an axial plane P. Each half-shell has two axially spaced outer peripheral flanges 2b and 3b enabling positive interfitting with a split housing member 21, 22 illustrated in phantom lines in FIG. 3. Recesses 2a, 3c on the inner shell surface facilitate lubrication by communicating with an oil channel 14 shown in FIGS. 4–6. The two half-shells are further lined with internal low-friction bearing layers 2d and 3d, respectively.

Shell half 2 is provided with a threaded bore 5, perpendicular to its end face 2a, engaged by a complementarily threaded extremity 4 of a bolt 1 loosely linking the two halves to each other. A head 7 of bolt 1 is received with clearance F in a recess 6 of shell half 3, aligned with threaded bore 5, which is intersected by a generally radial bore 8 accommodating a cross-pin 9 with all-around play. Pin 9, frictionally fitted into bolt head 7, prevents a withdrawal of the bolt from shell half 3. Thus, the two halves can readily orient themselves about an axis A, FIG. 3, upon being inserted between housing 21, 22 and a shaft 15 centered on that axis.

The coupling between shell halves 2 and 3 shown in FIG. 2 differs from that of FIG. 1 in that the bolt is here provided with a grub screw 10 unilaterally inserted into its head 7, screw 10 being received with clearance in a bore 8' intersecting the recess 6.

Figure 4:
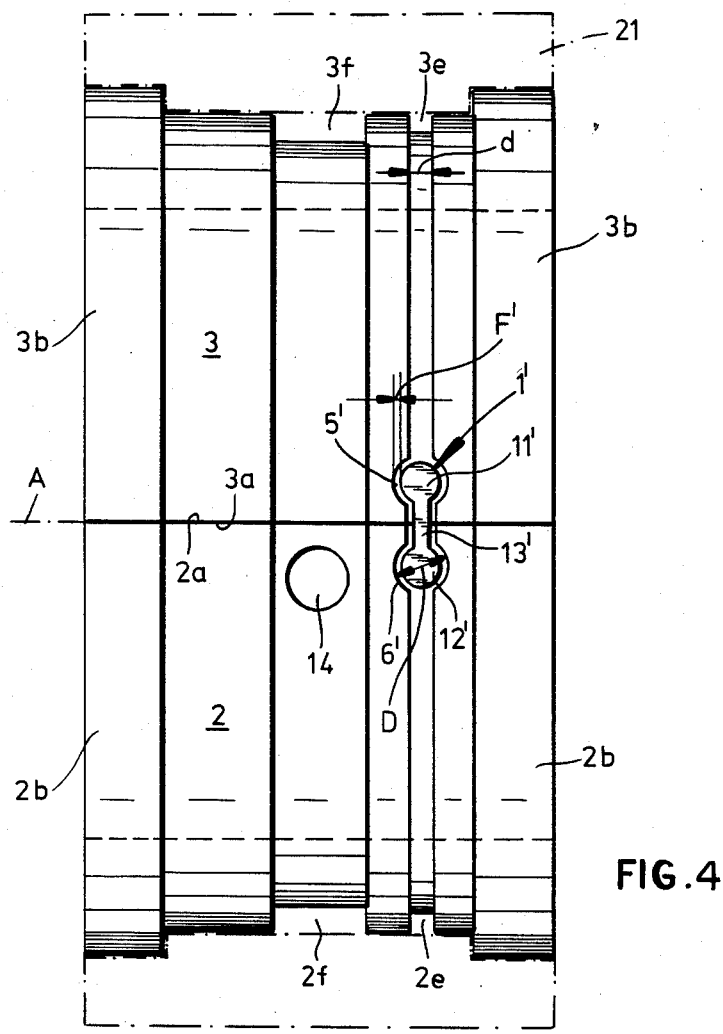
FIG. 4 is a side view taken in the direction of arrow IV in FIG. 3.

In FIGS. 3 and 4 we have illustrated a modified link 1' comprising a clip with a body 13' in the form of a straight flat strip with enlarged ends 11', 12' forming a pair of disk-shaped heads whose outlines extend over almost a full circle. An intermediate peripheral zone of each half-shell 2 and 3 flanked by flanges 2b and 3b is formed, as seen in FIG. 4, with a central groove 2f, 3f and a narrower lateral groove 2e, 3e, the latter accommodating the strip 13' of link 1' with clearance F' and being locally broadened with peripheral depressions 5' and 6' accommodating the heads 11' and 12' with play, these depressions having diameters significantly exceeding the diameter D of each head.

Shaft 15 may be either slidably or rotatably engaged by the antifriction layers 2d and 3d of shell halves 2 and 3.

Figure 5:
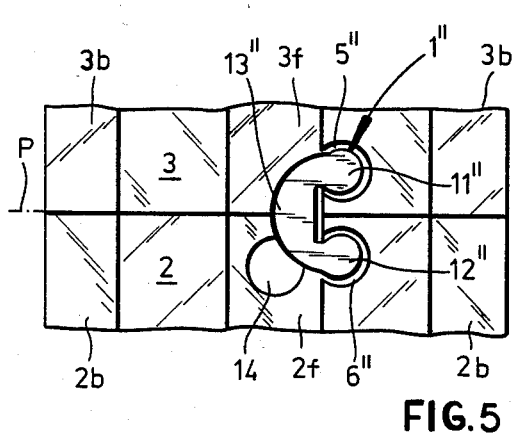
FIGS. 5 and 6 are fragmentary side views similar to part of FIG. 4 but showing different clip configurations.

FIG. 5 shows a link 1" formed by a generally C-shaped clip with a curved body 13" terminating in two heads 11", 12", body 13" occupying part of central grooves 2f, 3f while its heads 11", 12" fit with clearance into part-circular depressions 5", 6" opening into that groove.

Figure 6:
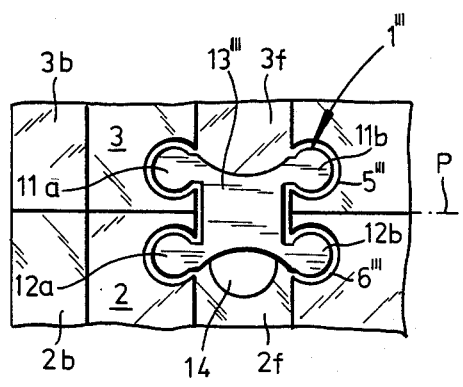

In FIG. 6 we have illustrated a link 1''', also designed as a clip, with a generally X-shaped body 13''' of symmetrical configuration having two pairs of heads 11a, 11b, received with clearance in depressions 5''' on opposite sides of groove 3f, and 12a, 12b, similarly received in depressions 6''' on opposite sides of groove 2f.

In all these instances, as will be apparent, the clip bodies could be either flat (as shown in FIG. 3) or curved about axis A.

Naturally, any of the links shown in FIGS. 1–6 is advantageously duplicated at the two pairs of end faces 2a, 3a meeting along the common parting plane P. With the assembly of FIGS. 3 and 4 it is further possible to provide a second pair of grooves 2e, 3e to the left of central grooves 2f, 3f (as viewed in FIG. 2) to accommodate two additional links 1' on diametrically opposite sides of axis A.

Although the clips of FIGS. 3–6 are all shown to be received with clearance in both shell halves, we may insert them with a close frictional fit into one of these halves to prevent their spontaneous detachment when the shell is extracted from housing 21, 22. For this purpose it is merely necessary to enlarge the corresponding heads (e.g. 12') or to reduce the radius of curvature of the associated depressions (e.g. 6').

We claim:

1. A bearing shell split into two substantially semicylindrical half-shells jointly receivable in an annular interspace between an outer member and in inner member movable relatively to each other, said half-shells having two pairs of end faces confronting each other across a parting plane, said half-shells being positively interconnected by screwless link means extending across said parting plane in a region of at least one of said pairs of end faces, said screwless link means engaging at least one of said half-shells with sufficient play to enable limited relative displacement of said half-shells parallel and perpendicular to said parting plane upon insertion into said interspace but preventing separation of said half-shells upon removal thereof from said interspace, said half-shells having aligned peripheral grooves along outer peripheries of said half-shells communicating with respective peripheral depressions disposed laterally thereof in the region of each of said pairs of end faces, said link means comprising unitarily a strip of uniform thickness and handle-shaped outline having a body received with clearance in said grooves and having disk-shaped heads extending with clearance into and received with play in said depressions and radially retained therein by said outer members, said heads adjoining portions of said body narrower than said heads.

2. A bearing shell as defined in claim 1 wherein said body is planar.

3. A bearing shell as defined in claim 2 wherein said heads have curved outlines extending over more than a semicircle.

4. A bearing shell as defined in claim 3 wherein said strip is generally C-shaped.

5. A bearing shell as defined in claim 2 wherein each of said grooves is flanked by a pair of said depressions.

6. A bearing shell as defined in claim 5 wherein said depressions have arcuate boundaries extending over less than a semicircle, said heads having lateral portions received in said depressions.

7. A bearing shell as defined in claim 5 wherein said depressions have arcuate boundaries extending over more than a semicircle, each of said enlarged forming two of said heads which curved outlines extending over more than a semicircle.

* * * * *